(No Model.)

J. VICTOR.
VALVE.

No. 529,051. Patented Nov. 13, 1894.

Witnesses:

Jacob Victor
Inventor.

By Benj. G. Cowl
Attorney.

UNITED STATES PATENT OFFICE.

JACOB VICTOR, OF WINONA, MINNESOTA.

VALVE.

SPECIFICATION forming part of Letters Patent No. 529,051, dated November 13, 1894.

Application filed July 3, 1894. Serial No. 516,494. (No model.)

*To all whom it may concern:*

Be it known that I, JACOB VICTOR, a citizen of the United States, residing at Winona, in the county of Winona and State of Minnesota, have invented certain new and useful Improvements in Valves; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in globe and other similar valves and faucets, which are used in connection with steam and other pipes; and its object is to provide an improved construction of the same in which the valve or plug may be readily removed from its seat for repairs or otherwise, without the necessity of disconnecting the casing thereof from the pipes.

The invention consists in the novel construction and combination of parts hereinafter fully described and claimed.

Figure 1:
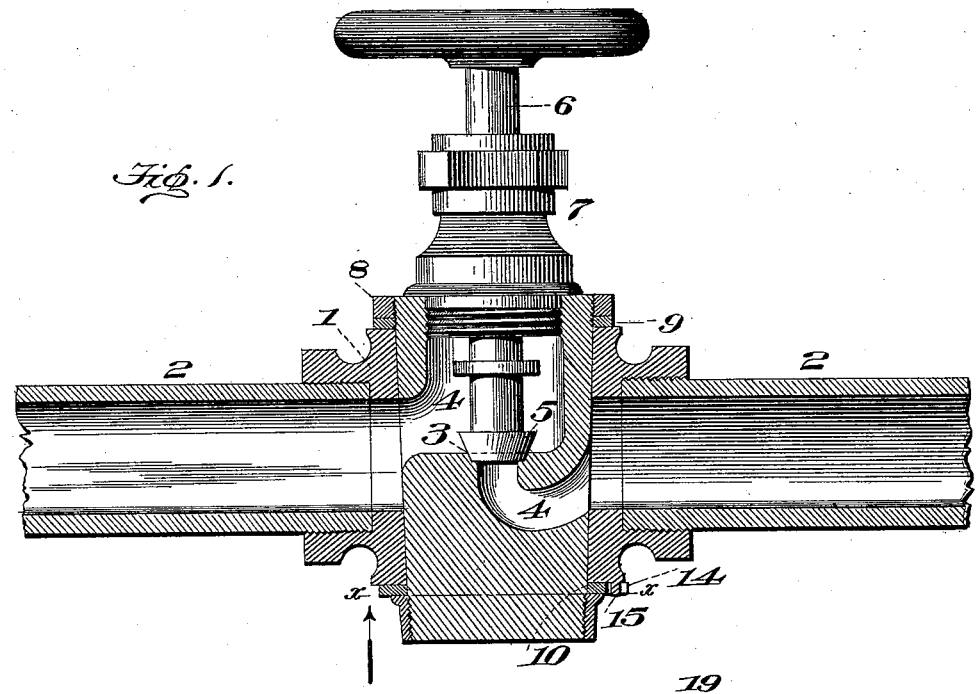
Figure 2:
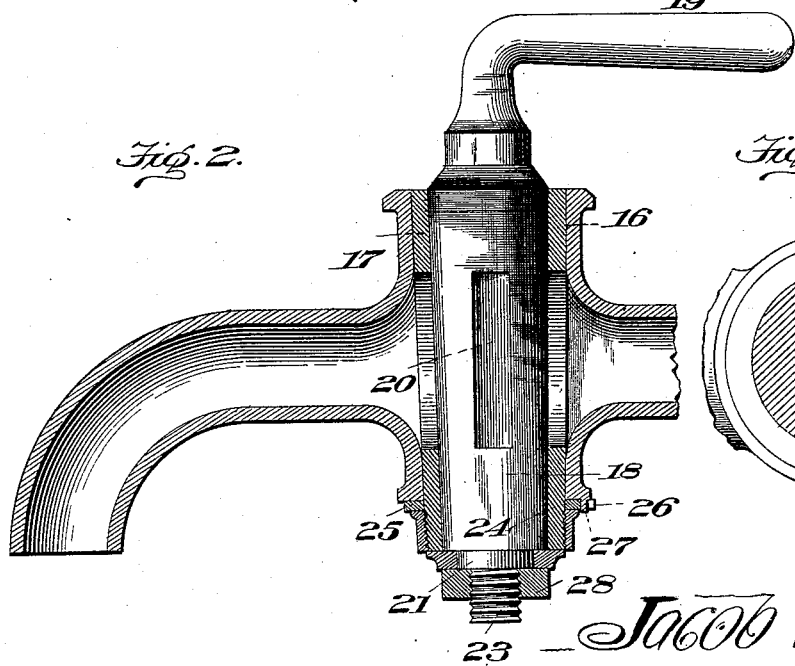

In the accompanying drawings, Figure 1 is a central longitudinal section of a globe valve constructed in accordance with my invention. Fig. 2 is a longitudinal sectional view showing my improvements applied to a faucet, and Fig. 3 is a detail sectional view taken on the line x—x Fig. 1, to more clearly show the collar for locking the valve or plug casing against rotation.

In the said drawings, referring now to Figs. 1 and 2, the reference numeral 1, designates a coupling with which are connected steam or other pipes 2, 2. Located in this coupling is a valve seat 3, and passages 4, 4, and a valve 5, having a stem 6, which passes through a stuffing box 7, connected with said casing. The upper and lower ends of the casing project beyond the coupling and are screw threaded to receive a nut 8, and at the said upper end is a washer 9 interposed between the nut and casing. The casing near its lower end is formed with a flattened portion 10, and fitting on said end is a collar 12, having a flattened portion 13, corresponding and engaging with the portion 10. At its periphery this collar is provided with a notch or recess 14, with which engages a pin or stud 15 on the coupling 1.

The operation will be readily understood. The casing is inserted in the coupling and the collar is placed in position with the flattened portion thereof engaging with the flattened portion of the casing, and the pin or stud 15 engaging with the notch 14. The nut 8 is then applied and screwed home, compressing the collar between it and the lower end of the coupling and preventing the casing from rotating. The valve is then inserted in the casing and the nut and washer at the upper end of the case placed in position.

Figure 3:
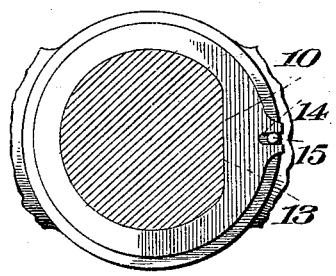

In Figs. 3 and 4, I have shown a modified construction, the improvements being applied to a faucet. In said figures the reference numeral 16 designates the faucet casing; 17 a valve casing located therein, and 18 a turning plug, provided with a handle 19, and formed with a passage 20. The lower end of the turning plug is formed with a shoulder 21 and a screw threaded lug 23. The lower end of the valve casing —17— projects below the faucet casing 16 and is formed with a flattened portion 24, with which engages the flattened portion of an annular collar 25, having a notch 26, with which engages a pin or stud 27, on the faucet, similar to that before described with reference to the globe valve. The numeral 28 designates a nut for confining the collar in place. A nut 29 fits on the lower screw threaded end or lug of the turning plug.

It will be noted in both instances that the casing is tapering so that by tightening the nuts on the lower ends thereof the casings can be drawn down tightly in their seats in the coupling and faucet respectively. The turning plug can also be drawn down into its seat in the casing by the nut 28.

Having thus fully described my invention, what I claim is—

In a valve or faucet, the combination with the tapering casing, screw threaded and flattened at its lower end and provided with a nut, of the collar having a flattened portion engaging with the flattened portion of the casing and formed with a peripheral notch, and the stud engaging therewith, substantially as described.

In testimony whereof I affix my signature in presence of two witnesses.

JACOB VICTOR.

Witnesses:
EDWARD LEES,
CHARLES MULLER.